United States Patent [19]

Tsugawa et al.

[11] Patent Number: 5,553,372
[45] Date of Patent: Sep. 10, 1996

[54] APPARATUS FOR INSERTING INSULATION SHEETS INTO SLOTS OF A STATOR CORE

[75] Inventors: Takayuki Tsugawa, Kanagawa-ken; Masahiro Tomita, Gunma-ken, both of Japan

[73] Assignee: Odawara Engineering KK, Japan

[21] Appl. No.: 317,571

[22] Filed: Oct. 4, 1994

[51] Int. Cl.⁶ .................................................. H02K 15/10
[52] U.S. Cl. .................................................. 29/734; 29/596
[58] Field of Search ........................... 29/596, 734, 736, 29/809

[56] References Cited

U.S. PATENT DOCUMENTS

| | | | |
|---|---|---|---|
| 4,831,715 | 5/1989 | Witer | 29/596 |
| 4,831,716 | 5/1989 | Luciani et al. | 29/596 |
| 4,854,033 | 8/1989 | Luciani et al. | 29/596 |
| 4,901,433 | 2/1990 | Barrera | 29/734 |

FOREIGN PATENT DOCUMENTS

| | | | |
|---|---|---|---|
| 54-154003 | 12/1979 | Japan | 29/274 |
| 59-39982 | 9/1984 | Japan | |
| 63-268453 | 11/1988 | Japan | 29/734 |
| 1050055 | 10/1983 | U.S.S.R. | 29/734 |

*Primary Examiner*—S. Thomas Hughes
*Attorney, Agent, or Firm*—Thompson Hine & Flory P.L.L.

[57] ABSTRACT

A method of inserting a pair of connecting portions of an insulation sheet into the slots in a stator core is disclosed. The insulation sheet includes a pair of body portions interconnected at their opposite ends by the connecting portions. The top sheet in a stack of insulation sheets is picked up and manipulated to be disposed in a vertical position. The vertically disposed insulation sheet is then gripped at positions slightly spaced inwardly from the opposite end areas of each body portion. After being gripped, the sheet is moved to a position above the stator core. At the position above the core, the intermediate area of each body portion is bowed to assume a "U" shape whereas the opposite end areas of each body portion are disposed in registry with predetermined slots of the stator core, respectively. Then, the bowed insulation sheet is moved in a direction parallel to the axis of the stator core into the center of the core, and thereby the connecting portions of the sheet are inserted into the appropriate slots.

6 Claims, 7 Drawing Sheets

APPARATUS FOR INSERTING INSULATION SHEETS INTO SLOTS OF A STATOR CORE

BACKGROUND OF THE INVENTION

This invention relates generally to a method for inserting an insulation sheet into the slots of a stator core, more particularly to a method of inserting an insulation sheet used for insulating multi-phase coils from each other, which coils are wound around a stator core of an electric rotary device such as an electric motor. The invention also relates to an apparatus for carrying out such a method.

Generally, there are two primary ways of insulating stator coils. One of those ways is called "slot insulation" in which insulation sheets are placed in the slots of the stator core insulating the inside surfaces of the slots from the coil wires in the slots. The other way is called "phase insulation" wherein insulation sheets are partially inserted into certain slots insulating the coil of the first phase from that of the second phase.

A number of devices for achieving slot insulation have been developed. These devices automatically insert insulation sheets into the slots together with the coil wires. Some of these devices are used effectively in automated wire-inserting processes.

In contrast, phase insulation has typically been carried out manually. Automation of the phase insulation process is difficult because phase insulation requires handling of a very thin flexible insulation sheet which has a pair of parallel strap portions interconnected by a pair of connecting portions. Particularly, it requires that the insulation sheet is bowed into an arcuate shape and that the connecting portions are inserted into two predetermined slots to achieve proper positioning of the sheet. This tedious process results in a loss of productivity.

A phase insulation device which can solve the above-mentioned problem is disclosed, for example, in Japanese Patent Kokoku No. 59-39982. This device is illustrated in FIGS. 7 and 8. In FIG. 7, an insulation sheet 101 is held upright by a vacuum on a forming block 102. The forming block 102 is moved in the direction of the arrow Q from the position shown in FIG. 7 and sandwiches the sheet 101 between itself and upper and lower blocks 103 and 104. By this means, the sheet 101 is corrugated. A center clamp 105 is then lowered to temporarily hold the sheet 101 between the center clamp 105 and the upper and lower blocks 103 and 104.

Meanwhile, a piston 106, shown in FIG. 8, is activated to secure the opposite end portions of the sheet 101 to the positions between an upper side clamp 107 and the upper block 103 and between a lower side clamp 108 and the lower block 104. Subsequently, the forming block 102 is moved back to the initial position, and the connecting portions 101a of the sheet 101 are put into grooves 109a of pusher guides 109, respectively.

A stator 110 is positioned above the upper block 103, and it is lowered after the slots 111 are aligned with the pusher guides 109, as shown in FIG. 8. Then, pistons 113 in a tooling 112, as shown in FIG. 7, are extended until the pusher guides 109 abut the inside surface of the stator 110. This causes the sheet 101 to be stationary while the connecting portions 101a are brought into alignment with the respective slots 111 of the stator 110. After that, the center clamp 102 and the upper and lower side clamps 107 and 108 are loosened to release the sheet 101. Then, pistons 114 in the tooling 112 are extended and pushers 115 are moved through the pusher guides 109 toward the stator 110. This allows the connecting portions 101a to be inserted into the respective slots 111 through the slot openings 111a. By this means, the sheet 101 expands based on its own resiliency to conform to the inside diameter portion of the stator. The insertion process for the insulation sheet 101 is thus completed.

According to the conventional method, as mentioned above, an insulation sheet 101 is sandwiched at its intermediate portion by the center clamp 105 and the upper and lower blocks 103 and 104 and at its opposite end portions by the upper and lower blocks 103 and 104 and the upper and lower side clamps 107 and 108. A stator core 110 is then moved to the position around the sheet 101 after positioned correctly with respect to the sheet 101. Following this step, the pistons 114 in the tooling 112 are extended to push the connecting portions 101a in a radial direction so that the connecting portions 101a are inserted into the respective slots 111, which connecting portions have been held in the grooves 109a of the pusher guides 109. Because the pushers 115 for pushing the connecting portions 101a must be moved through the narrow slot openings 111a of the associated slots 111, they are provided at their leading ends with recesses to prevent the connecting portions 101a from slipping off of the leading ends. This arrangement indeed facilitates insertion of the connecting portions in a string-like configuration. However, it also means that it would be easy for the inserted connecting portions to dislodge from their respective slots.

One solution of the aforementioned problem is a new type of insulation sheet which has recently become available. This new insulation sheet is struck as a unitary piece from such insulating sheet material such as nylon, polyester or other similar material. The sheet has connecting portions and body portions which are integrally formed with the connecting portions. The width of each connecting portion is greater than that of the opening of the associated slot so as to inhibit accidental disengagement of the connecting portions from the associated slots. However, such connecting portions have a greater width and are difficult to fit in the recesses of the pushers. Thus they tend to escape from the leading ends of the pusher during insertion process. Furthermore, such connecting portions could be ruptured as a result of being pressed against the opposite side edges of the leading ends. For these reasons, automation of insertion process for this new type sheet is again very difficult and no apparatus for automatically carrying out such a process has yet become available.

With the previously described apparatus, the insulation sheet is gripped at both its intermediate portion and at its opposite end portions. Then the pusher guides are moved forward to trap the sheet between the pusher guides and the inside surface of the stator. This machine therefore is useful only with those insulation sheets having their connecting portions at the positions spaced inwardly from the opposite end portions thereof and is not useful with the sheets with their connecting portions at the opposite ends thereof.

Also in the previously described apparatus, the insulation sheet is held vertically at the outset by the forming block. This step is difficult to automate, and therefore it must be accomplished either manually or by an extremely complicated automatic sheet dispenser.

An object of the present invention, therefore, is to provide a method of inserting into predetermined slots a one-piece insulation sheet having the connecting portions at the opposite ends thereof. A second object of this invention is to provide an apparatus which will automatically carry out such a method.

SUMMARY OF THE INVENTION

According to one embodiment of the invention, a method for inserting a pair of connecting portions of a flexible insulation sheet into the slots in a stator core of an electric rotary device is provided. The insulation sheet is of a one-piece structure and includes a pair of body portions interconnected at opposite ends by the connecting portions. According to the method, a stack of insulation sheets is prepared in which each sheet is horizontally disposed. Then, the top sheet of the stack is picked up by suction and manipulated to be disposed in a vertical condition. The vertically disposed sheet is then gripped at the portions inwardly spaced slightly from the opposite end of each body portion. After the sheet is gripped, the suction is removed from the sheet and the sheet is moved to a position above the stator core while maintained in the vertical condition. At a position above the stator core, the intermediate area of each body portion is bowed to assume a "U" shape whereas the opposite end areas of each body portion are disposed in alignment with predetermined slots of the stator core. Subsequently, the bowed insulation sheet is moved parallel to the axis of the stator core into the internal space of the core, and the connecting portions of the sheet are inserted into the predetermined slots.

A second object of this invention is to provide an apparatus for carrying out the above described method. The apparatus comprises a handling means and an insertion means. The handling means elastically deforms an insulation sheet such that the intermediate area of each body portion of the sheet assumes a "U" shape and the opposite end areas of each body portion are aligned with predetermined slots of the stator core. This means facilitates insertion of the sheet into the inside diameter portion of the core. The insertion means then moves the deformed sheet in the direction of the axis of the core so that the connecting portions of the sheet are inserted into the predetermined slots.

According to a preferred embodiment of the invention, the handling means includes a gripping means for gripping the insulation sheet at the portions thereof spaced slightly inwardly from the opposite end areas of each body portion to bring the opposite end areas into alignment with the predetermined slots and a deformation means for elastically deforming the intermediate area of each body portion into a "U" shape. In another preferred embodiment, the insertion means includes an insertion member for moving the deformed sheet in the direction of the axis into the core and also includes upper and lower guide members disposed on the opposite sides of the core to guide the opposite end areas of the sheet into the predetermined slots.

In a further preferred embodiment, the sheet inserting apparatus includes storage means for accommodating a stack of insulation sheets in a condition in which each sheet is horizontally disposed and a dispensing means for picking up the uppermost one of the stacked sheets to dispose the same in a vertical condition.

According to the method and the apparatus of the invention, the intermediate area of each body portion of each insulation sheet is elastically deformed to assume a "U" shape and the opposite ends of each body portion are disposed in alignment with the predetermined slots. Accordingly, when the insulation sheet is moved along the core axis into the stator core, one of the body portions of the sheet passes through the inside diameter portion of the core and thereby the connecting portions are inserted into the predetermined slots.

According to the apparatus wherein the handling means includes the gripping means and the deformation means, each insulation sheet can be deformed into a predetermined shape. According to the apparatus wherein the insertion means includes the insertion member and the upper and lower guide members, the connecting portions of each sheet are smoothly inserted into the predetermined slots without failure because the guide members reform the sheet even if the sheet has been distorted during the sheet deformation process.

In accordance with the apparatus having the storage means and the dispensing mean, the insulation sheets are automatically and consecutively picked up from the storage means and are supplied for the subsequent insertion process.

BRIEF DESCRIPTION OF THE DRAWINGS

FIG. 4-1 depicts the positioning of the grippers and deformation mechanism in an open position before they are inserted into the stator core;

FIG. 4-2 depicts the positioning of the grippers in the closed position and the deformation mechanism prior to insertion into the stator core;

FIG. 4-3 presents a plan view of the grippers and deformation mechanism as positioned above the stator core;

FIG. 4-4 presents a plan view of the grippers inserting the insulation sheet into its proper position inside the stator core;

DETAILED DESCRIPTION OF THE PREFERRED EMBODIMENT

Figure 5:
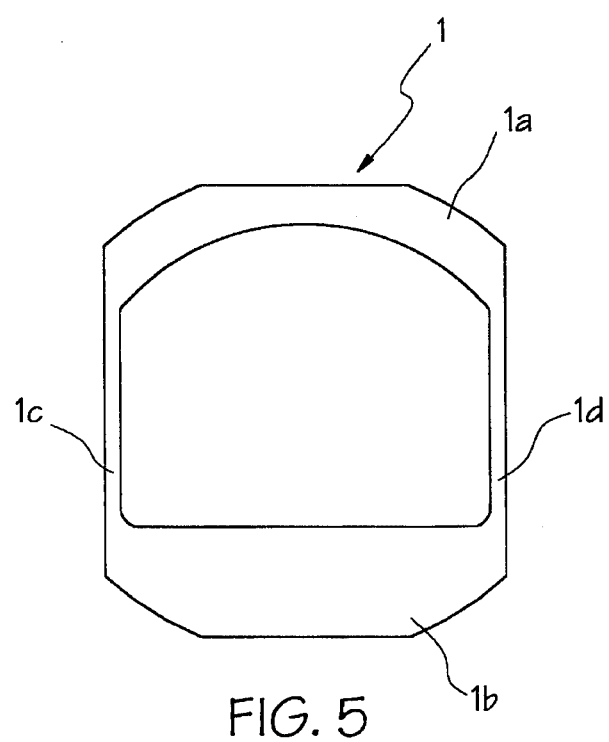
FIG. 5 is a view illustrating a sheet used in the present invention.

Referring now to the drawings, FIG. 5 illustrates a sheet of insulation paper used in conjunction with the invention. The insulation sheet 1 has a generally square configuration with a large, generally square center opening formed therein. This sheet 1 is struck from a thin flexible sheet of an electrical insulating material such as polyester, nylon or other similar material and therefore has a unitary construction. As shown in FIG. 5, the sheet 1 includes upper and lower body portions 1a and 1b and a pair of connecting portions 1c and 1d interconnecting the body portions 1a and 1b together at their opposite ends. The width of the body portions 1a and 1b is greater than that of the connecting portions 1c and 1d. The body portions 1a and 1b are provided with curved or tapered portions whereas the connecting portions 1c and 1d have a constant width.

Figure 1:
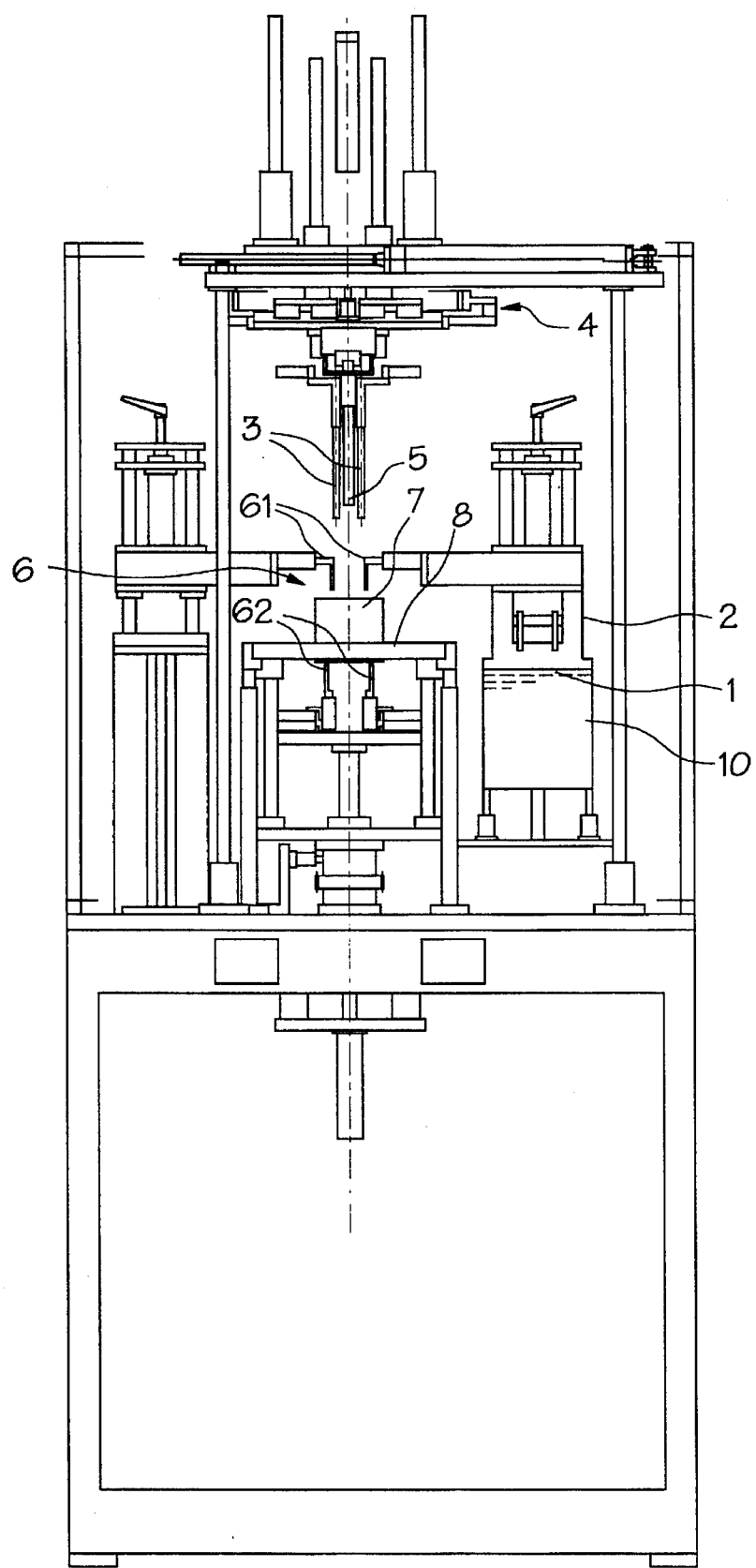
FIG. 1 is a side view of an apparatus according to the present invention.
Figure 2:
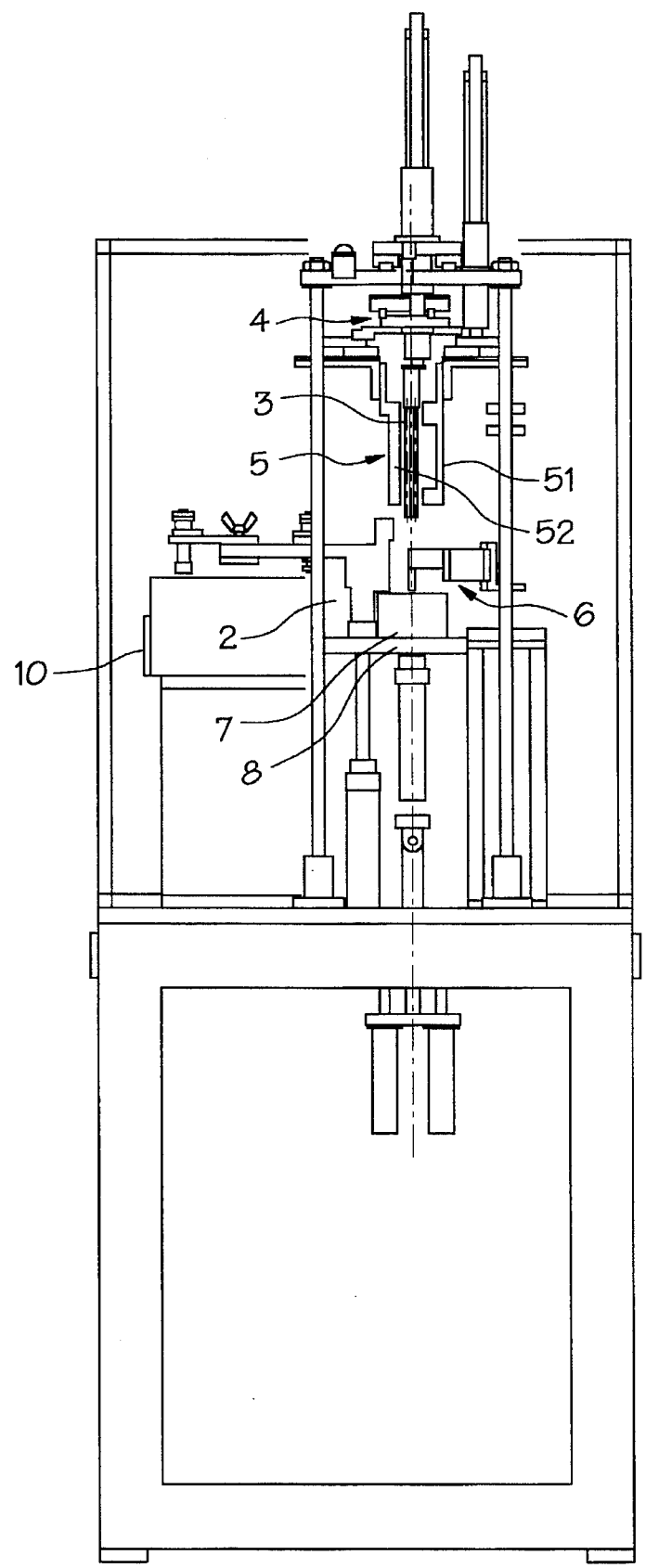
FIG. 2 is a front view of the apparatus of FIG. 1.

FIG. 1 is a side view, according to the invention, of an apparatus for inserting insulation sheets, such as those sheets described above, into predetermined slots of a stator core. FIG. 2 is a front view of the apparatus of FIG. 1.

As shown in FIGS. 1 and 2, the sheet-inserting apparatus comprises a magazine 10 which contains a stack of insulation sheets 1; a sheet dispensing unit 2 for picking up by suction the insulation sheets 1 consecutively from the magazine 10; and a sheet insertion unit 4 having a pair of sheet grippers 3 depending therefrom for holding the sheets 1 received from the dispensing unit. The grippers 3, when receiving a sheet 1, move to a position above a stator core 7 and then move downward to place the sheet 1 inside the stator core 7. During operation of the apparatus, the stator core 7 is fixed on a pallet 8 with its axis vertically disposed. In the same manner as the grippers 3, a sheet deformation mechanism 5 depends from the sheet insertion unit 4 to elastically deform the insulation sheet 1 into a predetermined shape. Sheet guide members guide the connecting portions into the slots of a stator core.

The stator core 7, which is fixed on the pallet 8, is transported to a predetermined position in the apparatus. The stator core 7 is mounted on the pallet 8 so that it is rotatable about its axis. When the insertion of an insulation sheet is completed, the core 7 is rotated 180° to allow insertion of another insulation sheet. Insulation sheets 1 are stacked in the magazine 10, and the sheet dispensing unit 2 removes the insulation sheets from the magazine 10 consecutively.

Figure 3:
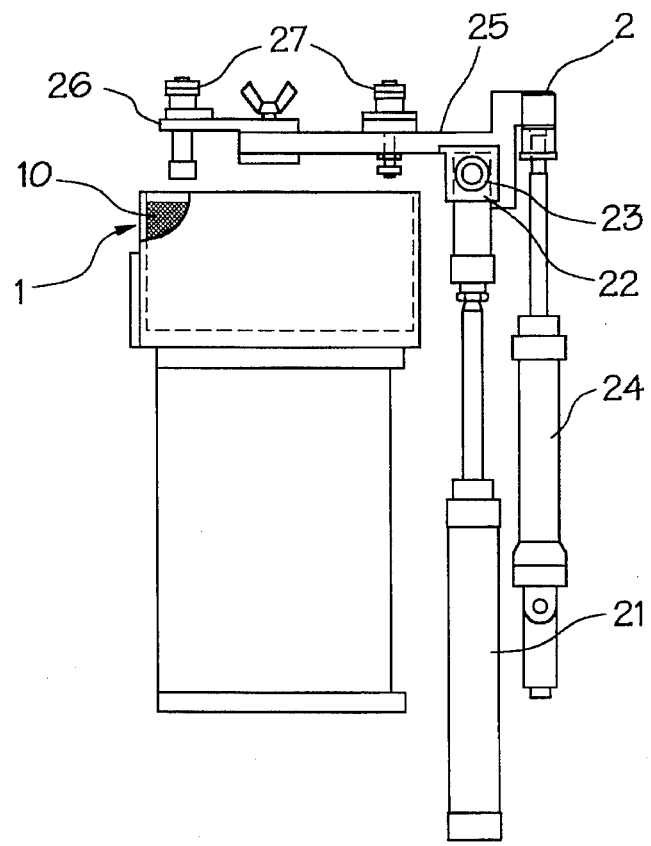
FIG. 3 is an enlarged side view of a sheet-dispensing unit of FIG. 2.

As shown in FIG. 3, the dispensing unit 2 comprises a unit body 22, a drive cylinder 21 for moving the body 22 upwards and downwards, a pick-up arm 25 connected to the shaft 23 for pivotal movement about the shaft 23, a drive cylinder 24 for pivoting the arm 25, an auxiliary pick-up arm 26 mounted on the arm 25 for movement along the length of the arm 25, and suction nozzles 27 mounted respectively on the pick-up arm 25 and the auxiliary arm 26. The auxiliary arm 26 is provided to adjust the position of one of the nozzles 27. The unit body 22 is lowered with its pick-up arm 25 in a horizontal position, as shown in FIG. 3, and then the suction nozzles 27 are operated to pick up the uppermost sheet 1 in the magazine 10. After the nozzles 27 catch hold of the uppermost sheet, the pick-up arm 25 is pivoted to a vertical position and then the unit body 22 is lifted to a predetermined position.

One skilled in the art will understand that each member described hereinafter is driven by its own driving cylinder in the same manner as the dispensing unit 2. These cylinders and the way of driving these members using the cylinders are well known in the art, and therefore description of these driving means is omitted for the purpose of simplifying the description.

Figures 1, 4:
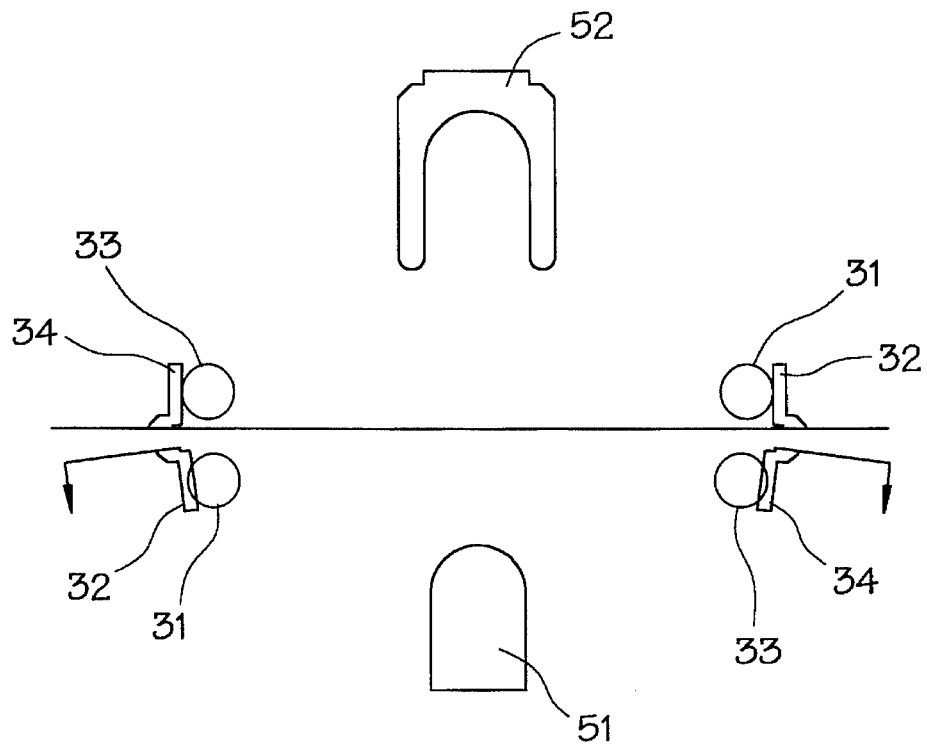
Figures 2, 4:
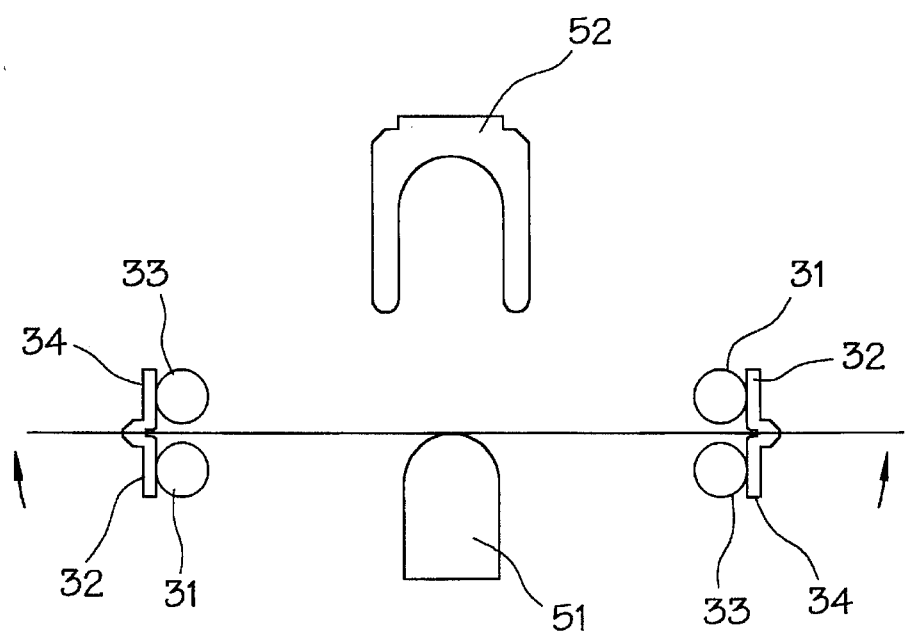
Figures 3, 4:
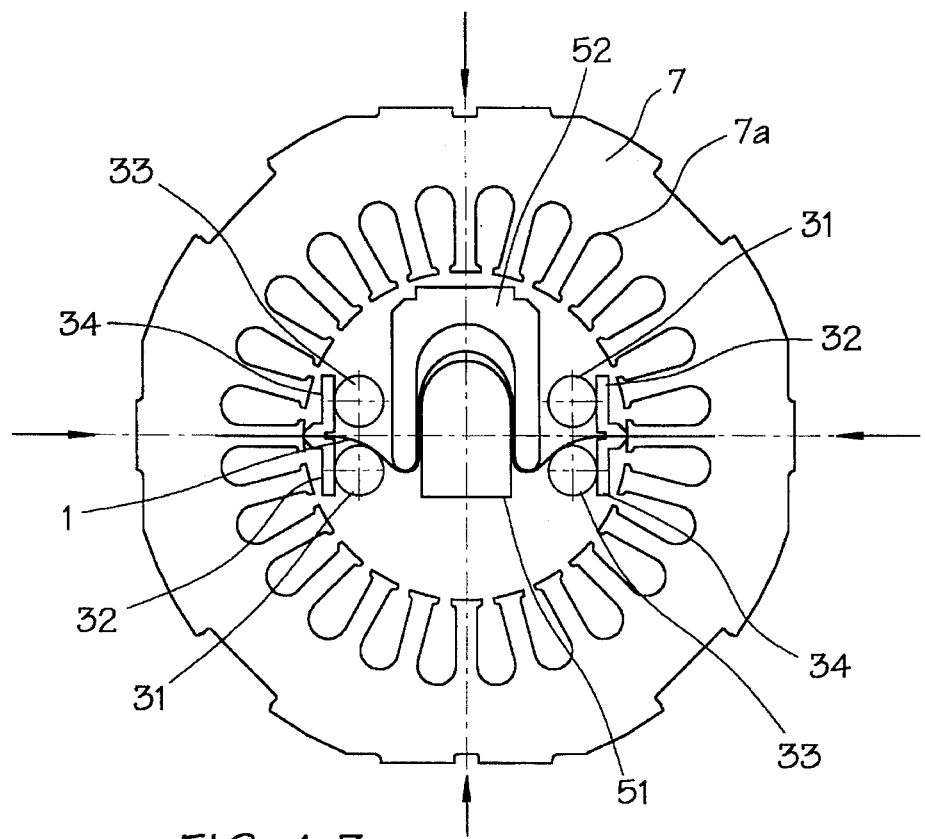
Figure 4:
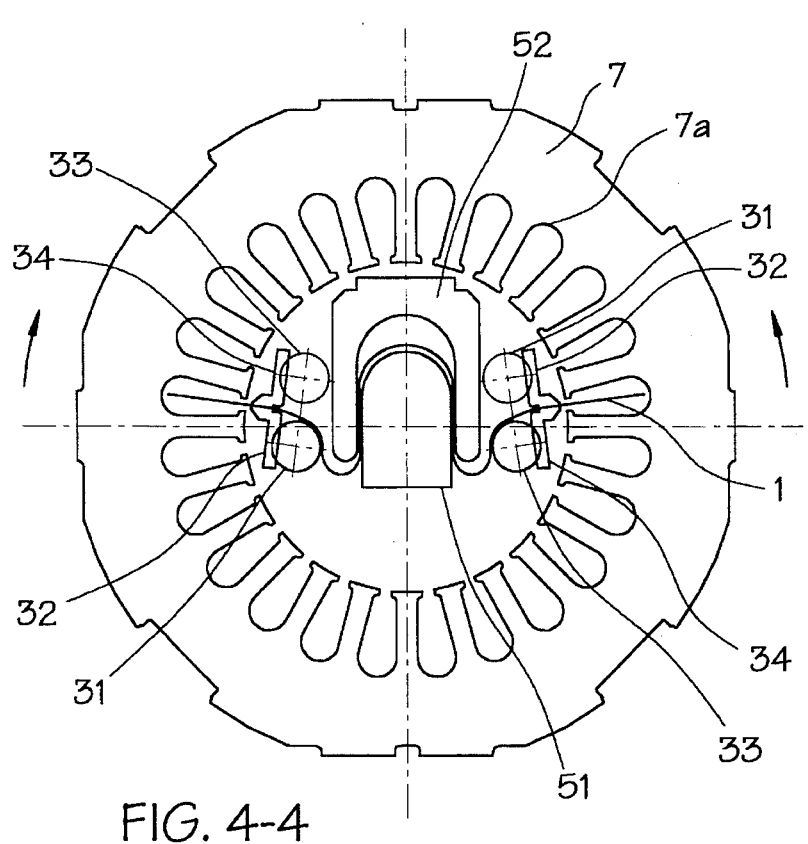

Each gripper 3 depends from the sheet insertion unit 4. As seen in FIG. 4-1, each gripper 3 comprises a fixed shaft 31, a first flange 32 formed integrally with the fixed shaft 31, a rotary shaft 33, and a second flange 34 formed integrally with the rotary shaft 33. Rotation of the shaft 33 of the right hand side gripper 3 in FIG. 4-1 in a first direction moves the flange 34 away from the stationary member 32 and allows insertion of an insulation sheet between the stationary member 32 and the movable member 34. Rotation of shaft 33 in a second direction closes the space between the first flange 32 and the second flange 34 and causes the flanges 32 and 34 to grip an insulation sheet. The left hand side gripper 3 is operated in a similar manner except that the rotating direction of the shaft 33 is opposite to that of the right hand side gripper 3. Rotary shaft 33 is rotated by a cylinder, which is not shown. One skilled in the art will appreciate that the grippers 3 are shown in cross section, and that first flange 32 and second flange 34 generally extend the entire length or width of the insulation sheet 1.

The first flange 32 and the second flange 34 of each gripper as a whole are also movable. More particularly, the grippers 3 are angularly movable with respect to each other between a position wherein the grippers 3 are slightly offset from a line and a position wherein the grippers 3 are disposed parallel to each other as viewed in FIG. 4-1. The degree of offset of each gripper is equal to the angle of each predetermined slot 7a with respect to a horizontal line. For example, the degree of offset will be 7.5° when the number of slots in the stator core is 24, i.e., 360° divided by 24 slots.

Figure 6:
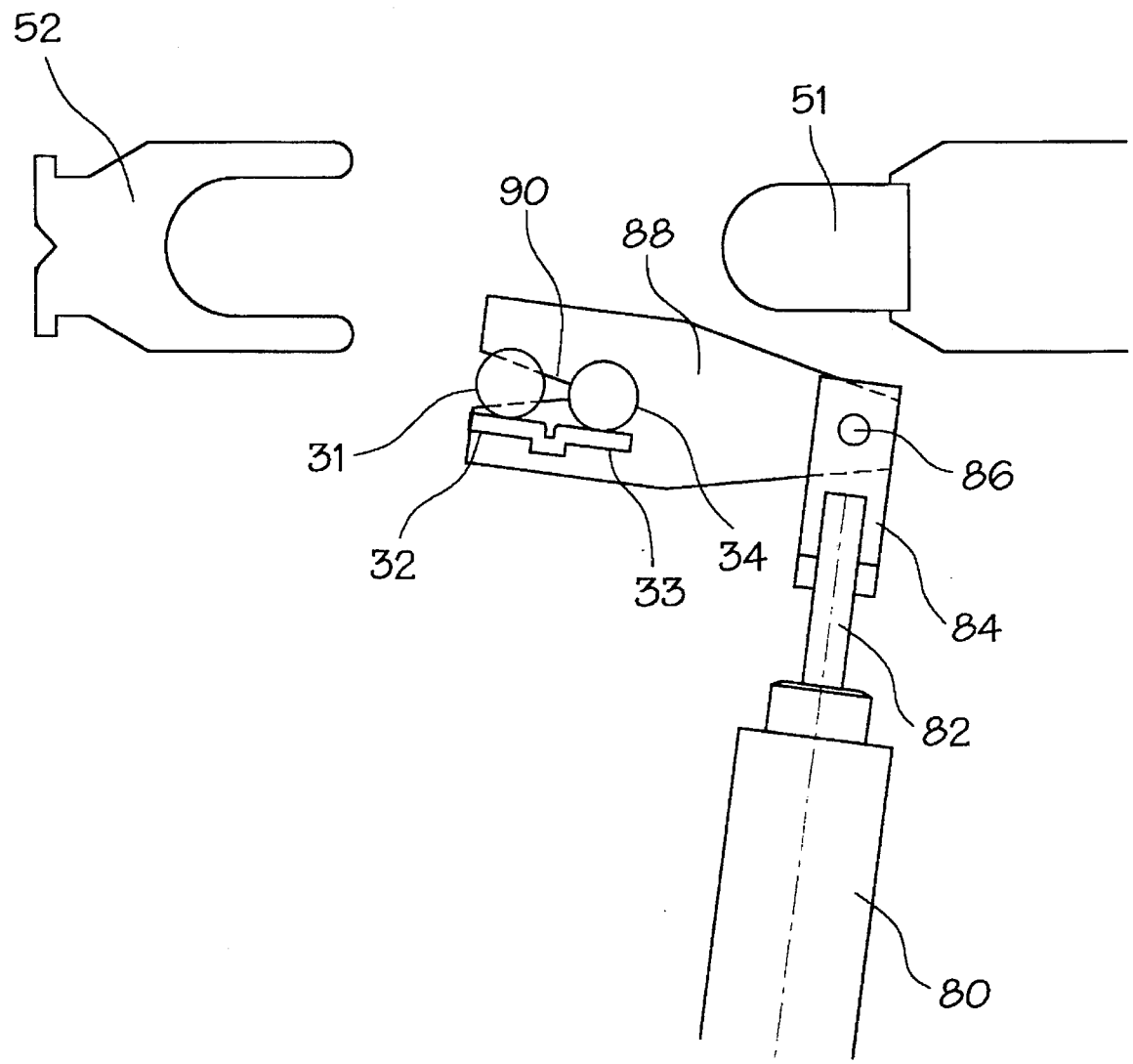
FIG. 6 is a detail view of the rotation mechanism for the movable grippers.
Figure 7:
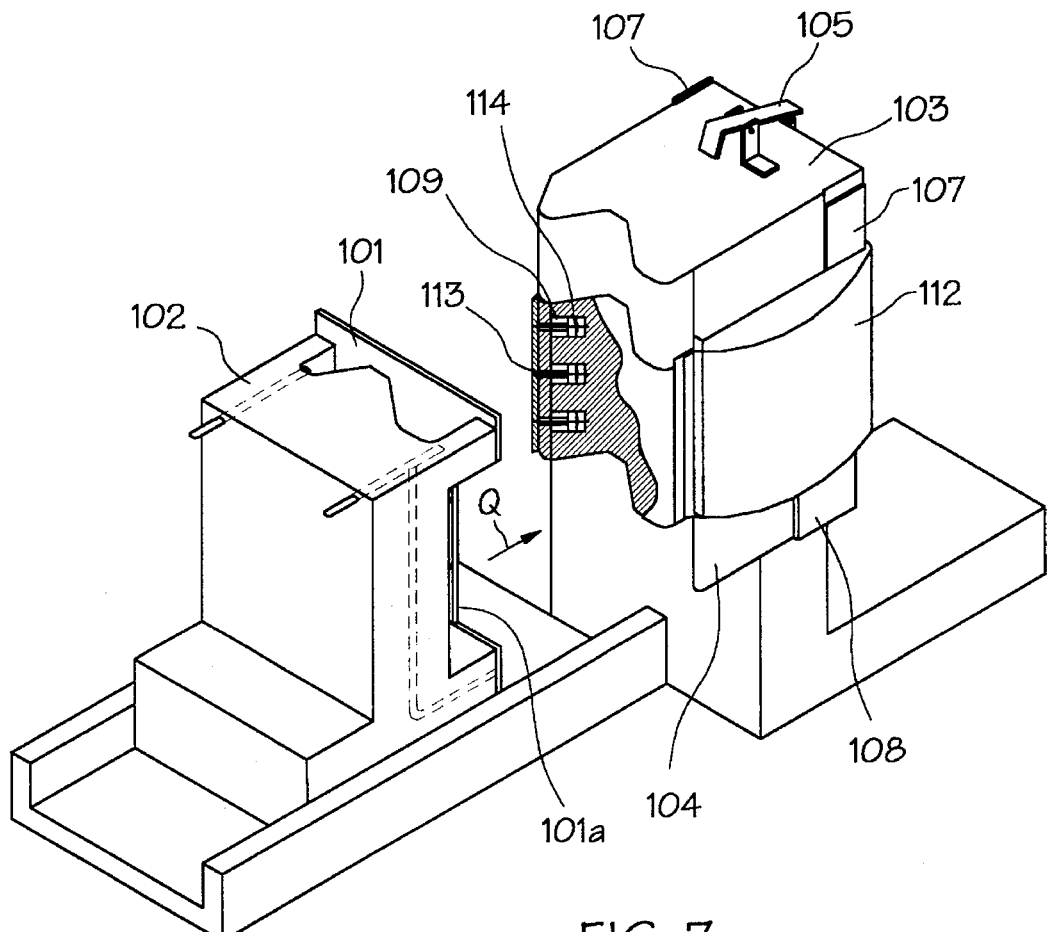
FIG. 7 is a perspective view of an example of a conventional sheet-inserting apparatus.
Figure 8:
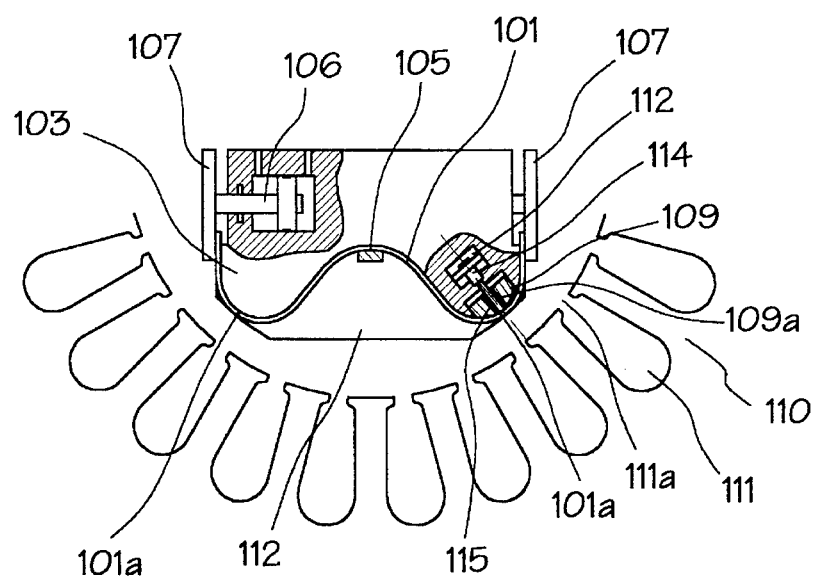
FIG. 8 is a view similar to FIG. 4-1 and illustrating a conventional sheet insertion apparatus.

As seen in FIG. 6, the gripper rotating mechanism for the rotary shaft 33 of the grippers 3 includes a cylinder 80, a shaft 82, a first link 84, a pin 86 and a second link 88. Shaft 82 is journaled at one end of cylinder 80 and at the opposite end to link 84. First link 84 engages pin 86 which in turn engages second link 88. Second link 88 includes a split collar 90 which engages rotary shaft 33. To open grippers 32 and 34, cylinder 80 is moved forward causing shaft 82 to move forward. As shaft 82 moves forward, first link 84 moves forward also. Because rotary shaft 33 pivots about a single point, the forward motion of shaft 82 causes link 88 to apply a torque to rotary shaft 33 causing rotary shaft 33 to rotate in a first direction. As rotary shaft 33 rotates, gripper 34 is moved away from gripper 32. Grippers 32 and 34 are closed by the retraction of cylinder 80 which causes rotary shaft 33 to rotate in a second direction. One skilled in the art will understand that, although the second set of grippers 3 are not shown in FIG. 6, they operate in a similar manner.

The sheet insertion unit 4, having the aforementioned grippers 3 depending therefrom, is not only movable horizontally between a first position above the sheet dispensing unit 2 and a second position above the stator core 7 but also movable vertically in both the first and second positions. When the insertion unit 4 is moved downward from the first position, the grippers 3 grip an insulation sheet which is held in a vertical condition by the dispensing unit 2. This allows the sheet 1 to be positioned between male and female members 51 and 52 of the deformation mechanism 5 as shown in FIG. 4-2. The deformation mechanism 5 and the grippers 3 in cooperation constitute a means for deforming an insulation sheet 1.

The sheet-guiding means of the apparatus includes a pair of upper guide members 61 and a pair of lower guide members 62. Each pair of guide members 6 are movable horizontally toward and away from each other as well as movable vertically. These guide members 6 are capable of slidably receiving an insulation sheet 1 and also capable of clamping the insulation sheet 1 received therein. When receiving a sheet 1, the guide members 6 serve as sheet-guiding means and function in cooperation with the insertion unit 4 as sheet insertion means.

The magazine 10 is filled with a number of insulation sheets 1 stacked vertically. One skilled in the art will understand that once the inserting apparatus is activated, each drive cylinder is activated in a predetermined sequence and sheet insertion is automatically carried out.

First, the pick-up arm 25 of the dispensing unit 2 is pivoted 90° from a vertical position to a horizontal position, and the unit body 22 is lowered to a pick-up position where a plurality of suction nozzles 27 (e.g., four nozzles) on the arms 25 and 26 grasp the uppermost sheet 1 by suction.

Simultaneously with this step, the upper guide members 61 and lower guide members 62 are moved forward to be in proximity with each other.

After picking up the sheet 1, the pick-up arm 25 is pivoted 90° back to a vertical position as the unit body 22 is moved upward. Then, the insertion unit 4, which has been on standby at the position above the dispensing unit 2, is lowered to a receiving position in which the grippers 3 are activated and move to grip, as described above and shown in FIG. 4-2, the vertically disposed insulation sheet 1 at the portions slightly spaced inwardly from the opposite end areas thereof. After the insulation sheet 1 is gripped, as shown in FIG. 4-1, the suction nozzles 27 of the arms 25 and 26 are deactivated.

Once the suction has been deactivated, the upper guide members 61 are moved downward so that the lower end portions of the guide members 61 are introduced into the inside of the stator core 7. Likewise, the lower guide members 62 are moved upwards so that the upper end portions of the guide members 62 are moved into the stator core 7. The upper guide members 61 are then moved away from each other, as are the lower guide members 62. In the meantime, the insertion unit 4 which holds the sheet 1 on the grippers 3 is moved upwards and then sideways to a position above the stator core 7, as shown in FIG. 4-3. At this position, each gripper 3 is rotated slightly, e.g. 7.5° in case of a stator core having 24 slots, with respect to a vertical line so that the opposite end areas of the sheet 1 are disposed in alignment with the slots 7a', as shown in FIG. 4—4.

Next, the male and female members 51 and 52 of the deformation mechanism 5 are moved forward to trap the sheet 1 between male member 51 and female member 52, as shown in FIG. 4—4. By this means, the sheet 1 is elastically bowed to assume a corrugated shape. While the sheet 1 is being bowed, the sheet dispensing unit 2 is lowered and picks up the next sheet from the magazine to be ready to insert the next sheet.

After the sheet 1 is corrugated, the insertion unit 4 is moved downward and inserts the sheet 1 into the slits of the upper and lower guide members 61 and 62. The connecting portions 1c and 1d are thus inserted into the predetermined slots 7a, as shown in FIG. 4—4, and thereafter the upper and lower guide members 61 and 62 are activated to clamp the sheet 1. The grippers 3 are then operated to release the sheet 1. Meanwhile, the dispensing unit 2 is moved upward and the arm 25 is pivoted to the vertical position.

After the above-described process has been completed, the male member 51 is moved backward and then the insertion unit 4 is moved upward above the stator core 7. The female member 52 is moved forward to allow the sheet 1 to expand, and the grippers 3 are turned back to a mutually parallel position. Then, the upper and lower guide members, 61 and 62, are activated to release the sheet 1. The upper and lower guide members, 61 and 62, are respectively moved downward and upward to enter the inside of the stator core 7. After this, the female member 52 is moved backward.

Simultaneously with the above-described process, the insertion unit 4 is moved from the position above the core 7 to the position above the dispensing unit 2, and then it is lowered to the receiving position. When the grippers 3 receive and grip the sheet 1 that has been held by the dispensing unit 2, the suction nozzles 27 of the dispensing unit 2 are deactivated to release the sheet 1.

The female member 52 is moved upwards and thereafter backwards. The upper and lower guide members 61 and 62 are moved forward, and the pallet 8 under the stator core 7 is rotated 180°, and the same steps described above are repeated once again to insert the connecting portions 1c and 1d of another sheet 1 into the other predetermined slots 7a. The sheet-inserting process for the stator core 7 is completed when the second sheet has been inserted. The body portions 1a and 1b of the sheets expand due to their own resiliency to conform to the inside diameter portion of the stator 7 when the insertion is completed.

According to the method of the invention as described above, the intermediate area of each body portion of the sheet 1 is elastically bowed to assume a "U" shape, the opposite end areas of each body portion are disposed in alignment with the predetermined slots of the stator core 7, and the sheet 1 is moved along the axis of the core 7 into the core 7. This method significantly facilitates insertion of connecting portions having a width greater than the width of the associated slot openings. The inserted connecting portions are oriented in the slots so that they do not easily dislodges from the slots.

The apparatus described above is designed to carry out the method of the invention and it includes a handling means for deforming the insulation sheet such that the intermediate area of each body portion is bowed to assume a "U" shape and the opposite end areas of each body portion are disposed in alignment with the predetermined slots of the stator core. It also includes a sheet insertion means for moving the bowed sheet in the direction of the axis of the core so that the sheet is introduced into the inside of the core. This arrangement facilitates smooth and accurate insertion of insulation sheets and inhibits disengagement of the sheets from the associated slots after insertion as compared to conventional insertion apparatuses which move insulation sheets radially outwardly of the core for the purpose of insertion.

As described above, the handling means may include a deformation mechanism for bowing the intermediate areas of the insulation sheet and the grippers for bringing the opposite end areas of the sheet into alignment with the slots. This arrangement prevents the handling means from turning into a heavy, large-sized mechanism such as those conventionally available, and allows the mechanism to be installed into a small space in the sheet-inserting apparatus. The insertion means may comprise an insertion member for moving the bowed sheet in the direction of the core axis into the core and an upper and lower guide members for guiding the opposite end areas of the sheet into the associated slots. In this arrangement, the sheet is correctly deformed upon insertion by the guide members even if the sheet has been distorted due to the sheet deformation process, and therefore the connection portions are inserted into the associated slots without failure.

As also described above, the insulation sheets used in the invention may be stacked in the storage means so that the dispensing means can pick up the uppermost sheet and pivot it into a vertical position. Although this arrangement is very simple, it allows the insulation sheets to be automatically picked up one by one to be supplied for the subsequent insertion process.

Having described the invention in detail and by reference to preferred embodiments thereof, it will be apparent that modifications and variations are possible without departing from the scope of the invention defined in the appended claims.

What is claimed is:

1. An apparatus for inserting a pair of connecting portions of a flexible insulation sheet into slots in a stator core, in which the insulation sheet has a one-piece structure and includes a pair of body portions connected at opposite ends by the connecting portions, the apparatus comprising:

- a gripping means for gripping the insulation sheet at positions spaced slightly inward from the opposite end areas of each body portion so as to bring the opposite end areas into alignment with said predetermined slots;
- a first member having an "U"-shaped cross section;
- a second member receivable in the first member to elastically deform the intermediate area of each body portion into a "U" shape; and
- an inserter for inserting the deformed sheet into the stator core so that the connecting portions of the sheet are inserted into the predetermined slots.

2. The apparatus of claim 1 wherein the inserter comprises a first member for moving the deformed sheet in the direction of the stator core and upper and lower guide members disposed on opposite sides of the core for guiding the opposite end areas of the sheet into the predetermined slots.

3. The apparatus according to claim 1 further comprising a storage means for accommodating a stack of the insulation sheets in a horizontal position and a dispensing means for picking up the top sheet in the stack and manipulating the sheet to a vertical position.

4. The apparatus of claim 2 wherein the first member comprises a pair of grippers, each gripper having a fixed shaft, a first flange formed integrally with the fixed shaft and a rotary shaft having a second flange formed integrally therewith; wherein rotation of the rotary shaft in a first direction moves the second flange away from the first flange and allows insertion of an insulation sheet between the first and second flanges, and rotation of the rotary shaft in a second direction closes the space between the first flange and the second flange and enables the first and second flanges to grip an insulation sheet therebetween.

5. The apparatus of claim 4 wherein the grippers are angularly moveable with respect to each other.

6. The apparatus of claim 4 wherein the apparatus further comprises a dispensing unit, for removing an insulation sheet from a stack of insulation sheets, having a body, a drive cylinder for moving the body vertically, a shaft, a pick-up arm pivotally mounted on the shaft, a drive cylinder for pivoting the arm, an auxiliary pick-up arm mounted on the arm for movement along the length of the arm, and suction nozzles mounted on the pick-up arm and the auxiliary arm.

\* \* \* \* \*